United States Patent [19]

Potvin

[11] Patent Number: 5,274,362
[45] Date of Patent: Dec. 28, 1993

[54] ELECTRONIC BLACKBOARD INTERFACE

[76] Inventor: Lucien Potvin, 26 Beaufort Drive, Kanata, Ontario, Canada, K2L 1Z4

[21] Appl. No.: 34,797

[22] Filed: Feb. 26, 1993

Related U.S. Application Data

[63] Continuation of Ser. No. 654,330, Feb. 12, 1991, abandoned.

[30] Foreign Application Priority Data

Feb. 28, 1990 [CA] Canada .................................. 2011204

[51] Int. Cl.$^5$ .............................................. G09G 3/02
[52] U.S. Cl. ...................................... 345/178; 178/20; 345/173
[58] Field of Search ...................... 340/712, 706, 709; 178/18, 19, 20; 341/23, 24, 34

[56] References Cited

U.S. PATENT DOCUMENTS

| | | | |
|---|---|---|---|
| 4,317,956 | 3/1982 | Torok et al. .......................... | 178/18 |
| 4,476,463 | 10/1984 | Ng et al. .............................. | 340/712 |
| 4,484,026 | 11/1984 | Thornburg ........................... | 178/18 |
| 4,501,931 | 2/1985 | Ohya et al. .......................... | 178/18 |

Primary Examiner—Tommy P. Chin
Assistant Examiner—A. Au
Attorney, Agent, or Firm—Baker & Daniels

[57] ABSTRACT

An interface for an electronic blackboard and more particularly a method and apparatus for determining the X-Y coordinates of a point on a writing surface and the output of the point on a video display device on a real-time basis wherein the electronic blackboard display system has both a contact mode and a self-calibration mode. The self-calibration mode is functional during times of non-contact. Contact signals from the electronic blackboard are digitized and displayed on a video display terminal in a color corresponding to a pen tray signal. The microprocessor can also output signals through a modem to a remote video display terminal.

5 Claims, 9 Drawing Sheets

C: DETERMINE IF SURFACE CONTACT

X+,X-,Y+,Y-   CALIBRATE

C: DETERMINE IF SURFACE CONTACT

X,Y: MEASURE POINT OF CONTACT

ELECTRONIC BLACKBOARD INTERFACE

This is a continuation of application Ser. No. 07/654,330, filed Feb. 12, 1991, now abandoned.

The present invention relates to an interface for an electronic blackboard and more particularly to a method and apparatus for determining the X-Y coordinates of a point on a writing surface and the output of the point on a video display device on a real-time basis.

Electronic blackboards of the type having two superimposed conductive surfaces brought into contact by a point of contact applied to the blackboard are well known in the art and will not therefore be described in great detail herein. Generally speaking however, the two electrically conductive layers of the board each have electrodes along their respective edges arranged orthogonally to one another to form the X and Y axes. The two layers are then alternatively biased at a predetermined rate. Power is first connected across one layer and the voltage (or voltage drop) at the point of contact is measured via the electrodes on the other layer to establish one coordinate. The other layer is then subjected to a potential and the voltage drop to the point of contact is similarly measured to establish the second coordinate.

In the present invention, the signals generated by contact with the electronic blackboard are processed by means of an electronic interface to digitize the signal for computerized video display. Prior art interfaces have suffered from several deficiencies. Some prior art interfaces are completely dedicated to a particular blackboard, and cannot be used in connection with the blackboards of other manufacturers. If the manufacture of the board is discontinued, such as recently occurred with systems manufactured by AT&T, the dedicated interface becomes obsolete or unusable if the boards are subsequently replaced.

Cost has been a problem due in part to the need for dedicated hardware constructed of extremely high quality components. This has been particularly true of power supplies. Previous systems have been capable of periodic calibration only, and to maximize the time interval between calibrations, it was sought to use the most stable, clean power supplies possible to minimize drift.

If accurate X-Y coordinates are to be obtained, the system must be periodically calibrated to account for naturally occurring drift in the power supply, changes in the resistivity of the writing surfaces themselves, and changes in the switching and measuring circuitry. To maximize the time interval between system calibrations, the tendency has been to use circuits and components having a high degree of accuracy and stability, but this obviously adds significantly to the cost.

one of the inherent problems with prior art systems is the fact that they are not self-calibrating. There are many factors which must be taken into consideration for the purposes of calibration if accurate measurements of the X-Y co-ordinates are to be made. Of particular significance are long term voltage variations, first in the power supply feeding the current through the writing surface, and secondly in the resistivity of the switching circuitry feeding the current to the writing surface. As these values change over time, the electronic blackboard must be recalibrated. One method of calibrating such a blackboard would be the manual use of potentiometers to recalibrate the blackboard periodically. A contact would have to be made at the top, bottom, and each of the two sides of the blackboard, the value read, and potentiometers could then be used to calibrate the blackboard. Obviously, this is not satisfactory for many uses.

Yet another problem has been system speed. Normally, display systems draw vectors on the video output screen. If the system speed is too slow, then calculation and video projection of the contact point will be done with insufficient speed, thus reducing the number of vectors which the display system will draw. With insufficient speed, a line drawn across the writing surface will appear on the video display as a jagged line. This obviously requires the user to deliberately slow his motions to accommodate system speed and obtain a smoother display, which is undesirable for a number of reasons, not the least of which is user annoyance. If calculation and video projection can be done more quickly, more vectors will be sent to the display system, meaning a smoother display.

Yet another problem has been a lack of remote projection capability, with most systems being incapable of digitizing the analog signals from the blackboard for transmission, such as by means of a modem, to a video output device at a distant location.

Additionally, it is desirable to have a video display capable of providing a display of different colours, which can be displayed using an ordinary coloured marker pen as the means of contact with the electronic blackboard.

Colour determination is done with sensors in the pen tray.

Finally, all electronic blackboard systems must be capable of differentiating between surface contact and no-contact modes, and this often requires that the writing instrument be in the form of a capacitance probe hard-wired to the system interface. This is undesirable for a number of reasons, including the need of additional circuitry, lack of flexibility and so forth.

It is therefore an object of the present invention to obviate and mitigate from the disadvantages of the prior art.

It is a further object of the present invention to provide an interface that is continuously self-calibrating thereby facilitating the use of more economical components, the switching between electronic blackboards of different sizes and the instantaneous compensation for system variables.

It is yet another object of the present invention to provide an improved means of determining surface contact at a point on an electronic blackboard and output the display on a video terminal on a real time basis.

It is yet another object of the present invention to provide an interface compatible with common open-architecture computers such as the IBM TM PC and its compatibles.

According to the present invention there is provided an electronic blackboard display system comprising:

(i) An electronic blackboard having first and second spaced apart electronically conductive surfaces, each said surface having a pair of approximately parallel electrodes proximate to the ends of each surface, the electrodes of the first surface being approximately orthogonal to the electrodes of the second surface, at least one surface being sufficiently resilient to permit contact between the surfaces upon application of pressure;

(ii) a voltage source capable of being connected to each pair of parallel electrodes which, when connected to the first or second set of parallel electrodes respectively when contact is present, will cause a first or second signal respectively to be generated;

(iii) a microprocessor in which said first and second contact signals are processed;

(iv) a contact determination circuit into which said first and second contact signals are inputted, said contact determination circuit generating a contact signal or a no-contact signal which is processed by said microprocessor;

(v) a video display terminal controlled by said microprocessor, said video display terminal receiving its input from said microprocessor;

Whereby when said first and second contact signals indicate no contact, a self-calibration circuit is activated for self-calibration of said electronic blackboard; and when said first and second contact signals indicate a contact signal, the self calibration circuit is deactivated and said microprocessor causes said video display terminal to output a video display signal dependent upon said first and second contact signals.

According to the present invention there is provided a method of self-calibration for an electronic blackboard display system having first and second spaced-apart electronically conductive surfaces, each said surface having a pair of approximately parallel electrodes proximate to the ends of each surface, the electrodes of the first surface being approximately orthogonal to the electrodes of the second surface, at least one surface being sufficiently resilient to permit contact between the surfaces upon application of pressure, a voltage source capable of being connected to each pair of parallel electrodes which, when connected to the first or second set of parallel electrodes respectively when contact is present, will cause a first or second signal respectively to be generated, and when contact is not present, causing at least one non-contact signal to be generated, said method comprising the following steps when a non-contact signal is generated:

(i) applying a voltage to the parallel electrodes of the first surface, said second electrodes having no voltage applied directly to them;

(ii) connecting a voltage measuring circuit first to one parallel electrode of the first surface and recording the measured voltage;

(iii) connecting a voltage measuring circuit to the other parallel electrode of the first surface and recording the measured voltage;

(iv) applying a voltage to the parallel electrodes of the second surface, said first electrodes having no voltage directly applied to them;

(v) connecting a voltage measuring circuit to one parallel electrode of the first surface and recording said measured voltage;

(vi) connecting a voltage measuring circuit to the other parallel electrode of the first surface and recording the measured voltage;

(vii) converting each of said four measured voltages to digital data; and (viii) updating previously recorded measurements with new measurements on a continuous basis.

Preferred embodiments of the present invention will now be described in greater detail and will be better understood with reference to the attached drawings in which.

Figure 1:
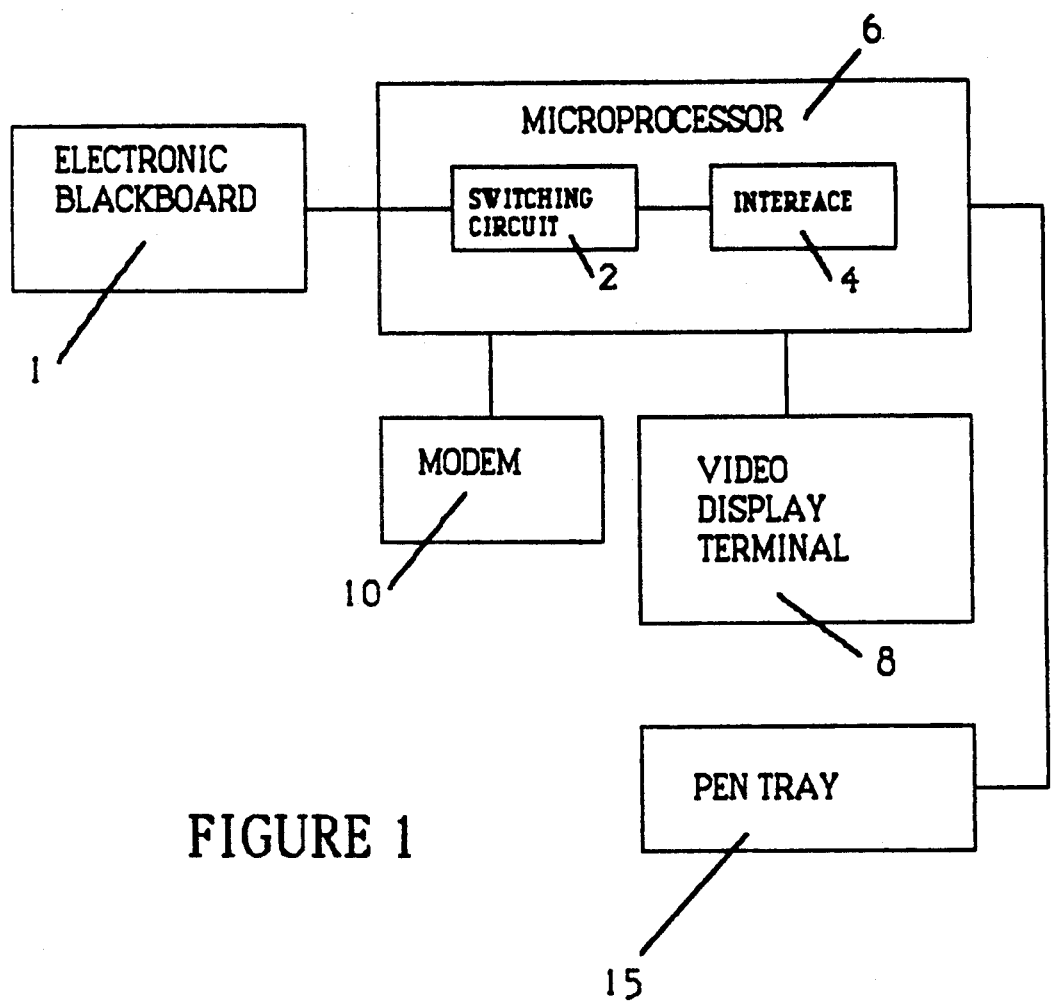
FIG. 1 is a system block diagram for the electronic blackboard system of the present invention.

With reference to FIG. 1, an electronic blackboard system consists generally of an electronic blackboard 1, a switching circuit 2 for interface board 4, a signal processor in the form of an electronic interface 4 which can be mounted, together with switching circuit 2, within an IBM-PC (or compatible) computer 6, a video display terminal 8 and (optionally) a modem 10 for transmitting digitized video signals to a remote video display.

Figure 2:
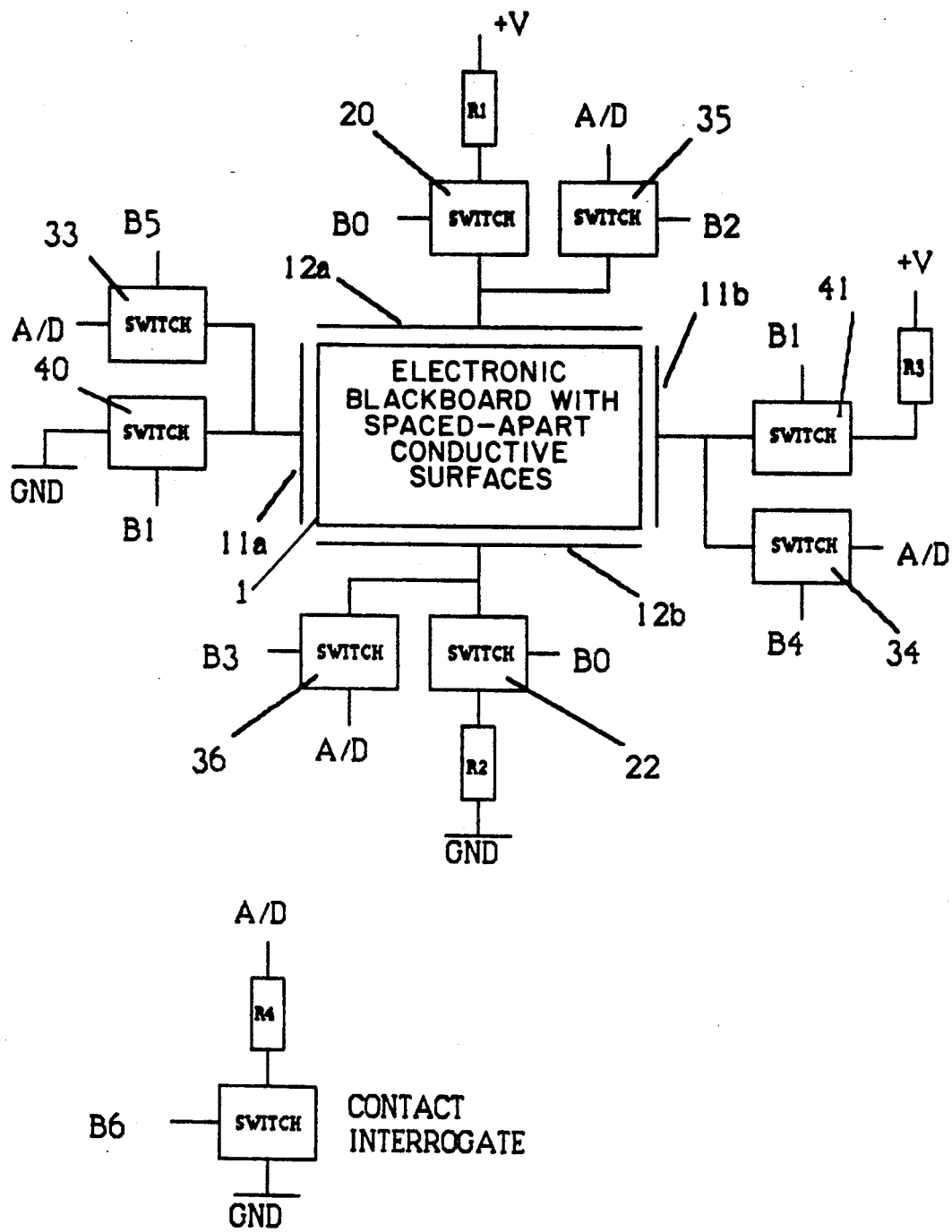
FIG. 2 is a block diagram of the switching circuitry of FIG. 1.

The switching of blackboard 1 to obtain X-Y coordinates for a point of contact can be accomplished in a number of known ways, one of which is shown in FIG. 2. Electronic blackboard 1 comprises two superimposed, spaced apart conductive layers having a pair of elongated electrodes 11a and 11b arranged orthogonally to a pair of elongated electrodes 12a and 12b. As also shown in FIG. 5, when surface contact has been made, a voltage V+ (typically 12 volts) is alternately applied to one pair of electrodes to bias the associated layer while the electrodes of the other layer are connected to a measuring circuit for measuring the voltage at the point of contact. A voltage is applied to one axis (e.g. the Y axis) through current limiting resistor R1, electronic switch 20, the Y-axis conductive layer $R_y$, electronic switch 22 and resistor R2 to ground. Interface 4 includes a 12-volt power supply alternately connected to the X-axis and Y-axis conductive layers through a group of analog electronic switches. At the same time, the electrodes of the X axis are connected via switches 33 and 34 to a circuit which measures the voltage at the point of contact (assuming of course that there is in fact surface contact).

The electronic switches are controlled in this manner to obtain approximately 35 X-Y coordinate measurements per second.

The electronic blackboard can be self-calibrating by the addition of a self-calibrating program which interacts with the hardware of the system. First, the system determines whether or not a contact has been made on the blackboard surface by use of a surface contact interrogation circuit as shown in FIGS. 2 and 5.

Figure 7A:
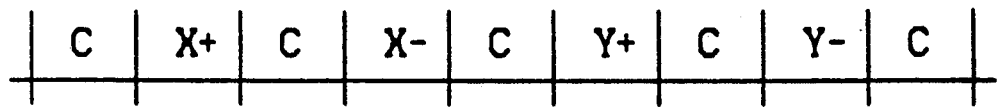
FIGS. 7A and 7B are sequence charts for contact/no contact modes.
Figure 7B:
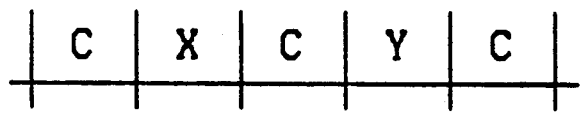

When no contact has been made on the blackboard surface, the system enters into the self-calibration mode. A sequence of events take place as shown in FIGS. 7A and 7B. The contact interrogation circuit shown in FIGS. 2 and 5 determines whether a contact has been made at regular time intervals shown by C in FIGS. 7A and 7B. In FIG. 7A, the contact determination circuit has determined that no contact has been made, and the self-calibration sequence is shown.

The first C in FIG. 7A has determined that there is no contact. Then a value X+ is determined by energizing switches 40 and 41 through current at B1 (see FIGS. 2 and 3A), and energizing switch 34 through current at B4. All other switches are open or deenergized. V+ voltage is applied to resistor $R_3$ through switch 41, the X-axis of the blackboard $R_x$, switch 40 to ground. The voltage at contact terminal 11b is measured through switch 34 and digitized through the A/D converter. This value X+ is stored for later use in calibrating the X-axis.

Again in FIG. 7A, a contact interrogation is made, and assuming there still is no contact, a value for X− is obtained by energizing switches 40 and 41 through current at B1, and switch 33 through current at B5. All other switches are open or deenergized.

Figure 3A:
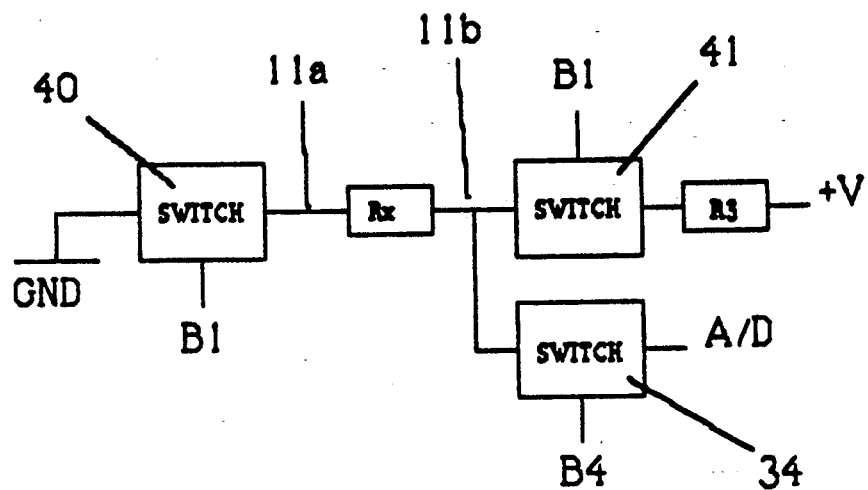
FIGS. 3A and 3B are equivalent circuits for the calibration of the X-axis.
Figure 3B:
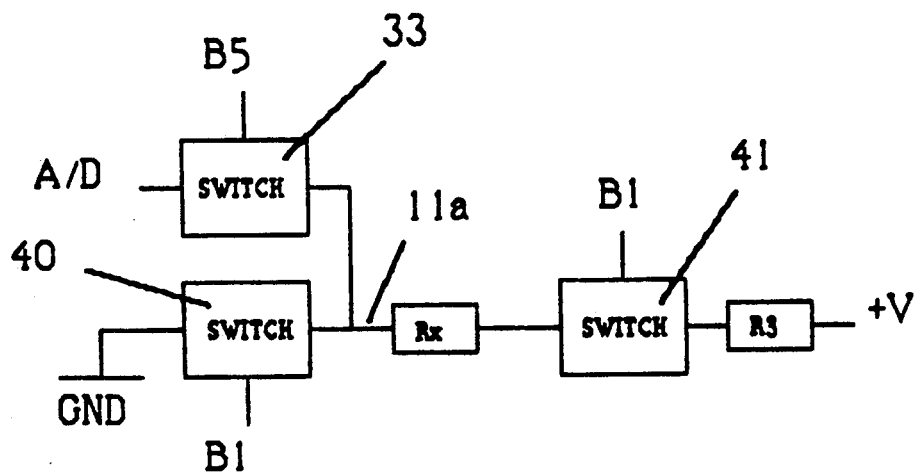

As shown in FIG. 3B, V+ voltage is applied to resistor $R_3$ through switch 41, the X-axis of the blackboard $R_x$, then switch 40 to ground. The voltage at contact terminal 11a is measured through switch 33 and digitized through the A/D converter. This value for X− is stored for later use in calibrating the X-axis.

Figure 4A:
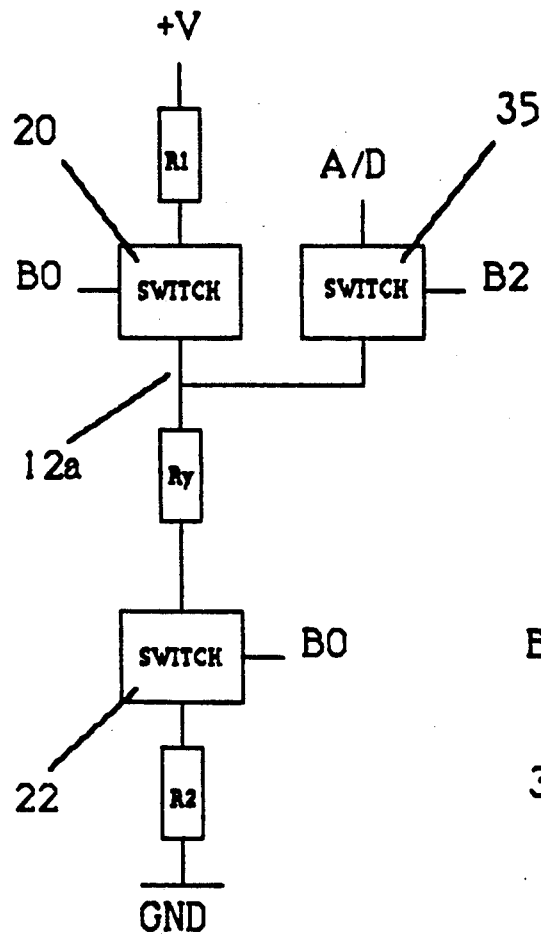
FIGS. 4A and 4B are equivalent circuits for Y-axis calibration.

Again, assuming there still is no contact as determined by the contact interrogation circuit, the sequence in FIG. 7A is continued to determine a value for Y+. As shown in FIG. 4A, V+ is applied to resistor $R_1$ through switch 20 which is energized through current B0, through the Y-axis of the blackboard $R_y$, then switch 22 which is energized by current B0, through resistor $R_2$ to ground. The voltage at contact terminal 12a is measured through switch 35 which is energized by current B2 and digitized through the A/D converter. All other switches are open or deenergized during this time interval. This value for Y+ is stored for later use in calibrating the Y-axis.

Figure 4B:
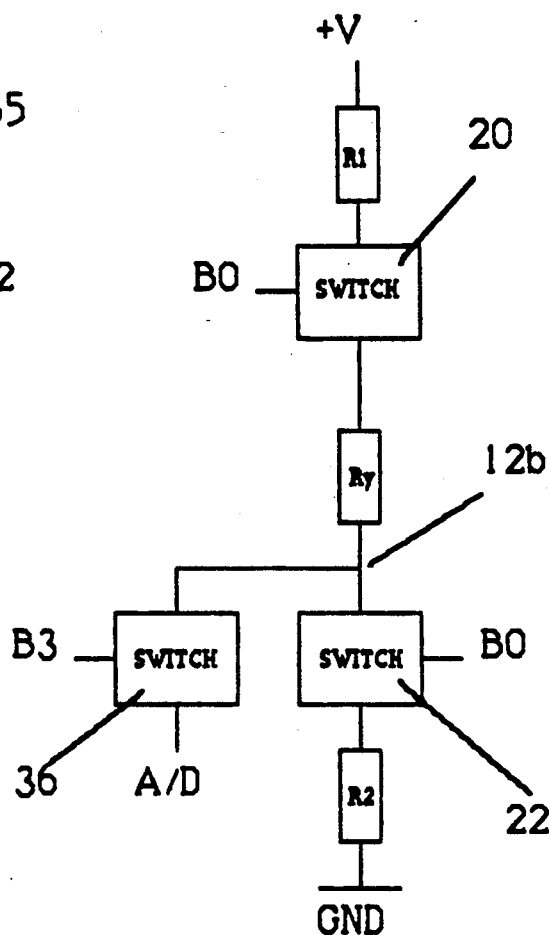

Again, referring to FIG. 7A, if there is still no contact as determined by the contact interrogation circuit, the sequence is continued to determine a value for Y−. As shown in FIG. 4B, V+ is applied through resistor $R_1$, through switch 20 which is energized by current B0, through the Y-axis of the blackboard $R_y$, then through switch 22 which is energized by current B0, through $R_2$ to ground. The voltage at contact terminal 12b is measured through switch 36 which is energized by current B3, and digitized through the A/D converter. All other switches are open or deenergized during this time interval. This value for Y− is stored for later use in calibrating the Y-axis.

Figure 8:
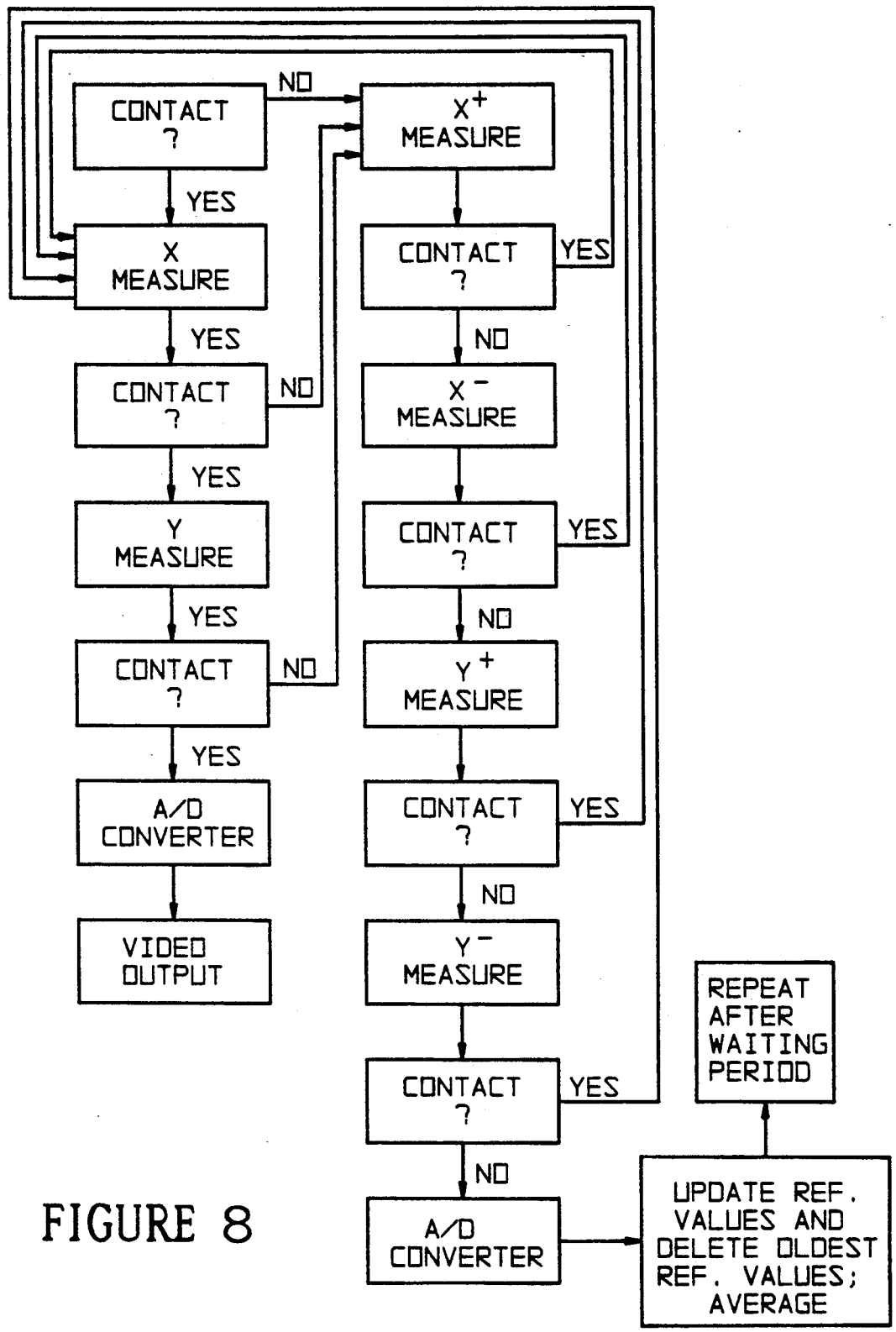
FIG. 8 is a flow chart of the contact/no contact modes of the present invention.

Such contact/no contact and self calibrating modes as described hereinabove with particular reference to FIGS. 7A and 7B are further shown as flow chart steps in FIG. 8.

In calibrating the Y-axis, it can be seen that the total Y resistance is $R_1+R_y+R_2$, and the voltage at contact terminal 12a is $V(R_y+R_2)/(R_1+R_y+R_2)$, while the voltage at contact terminal 12b is $V(R_2)/(R_1+R_y+R_2)$. During contact interrogation periods, the minimum total Y resistance (see FIGS. 2 and 5) is $R_1+R_y+R_2//R_4)$, and the minimum voltage at contact terminal 12b is $V_t = V(R_2//R_4)/(R_1+R_y+(R_2//R_4))$. If $R_2$ were not present, the voltage at contact terminal 12b would be zero both during times of contact at a point near contact terminal 12b and at times of no contact, thus making it difficult to differentiate between no contact and low Y-value contact. With the addition of $R_2$, the minimum value of voltage through the Y-axis at times of interrogation is not 0, but is $V_t$.

$$V_t = \frac{V \frac{R_2 R_4}{R_2 + R_4}}{R_1 + R_y + \frac{R_2 R_4}{R_2 + R_4}}$$

$$V_t = \frac{V R_2 R_4}{((R_2 + R_4)(R_1 + R_y) + R_2 R_4)}$$

$$V_t = \frac{V R_2}{\frac{R_2}{R_4}(R_1 + R_y) + (R_1 + R_y) + R_2}$$

Figure 6:
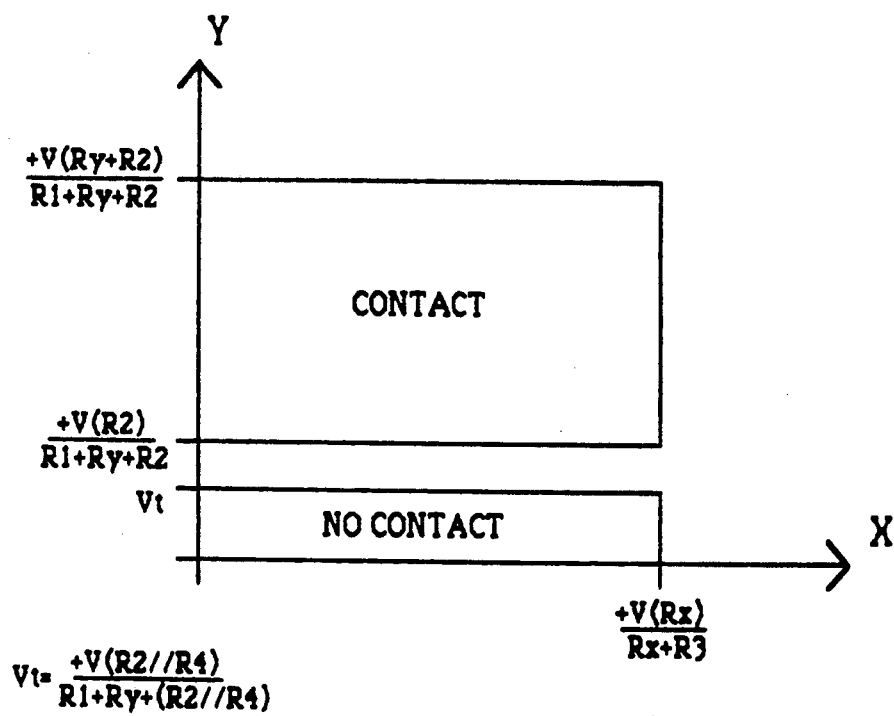
FIG. 6 is a voltage range chart wherein contact/no contact can be determined.

Since $R_2(R_1+R_y)/R_4$ is a positive number, $V_t$ is less than $VR_2/(R_1+R_y+R_2)$ which means that, because of the presence of $R_2$, no contact voltage will not be zero but will be a value $V_t$, and contact voltage will be greater than $V_t$ by a discrete measurable amount. This enables the system to easily differentiate between no contact and low Y-axis contact. This is demonstrated graphically in FIG. 6.

If contact is made during one of the interrogation periods as shown in FIG. 7A, the system switches out of the self-calibration mode and into the real time display mode, shown in FIG. 7B. The sequence is followed to determine the X and Y coordinates of contact to determine a point, which is then displayed on video display terminal 8 or, optionally, sent to modem 10 for further processing.

Figure 5A:
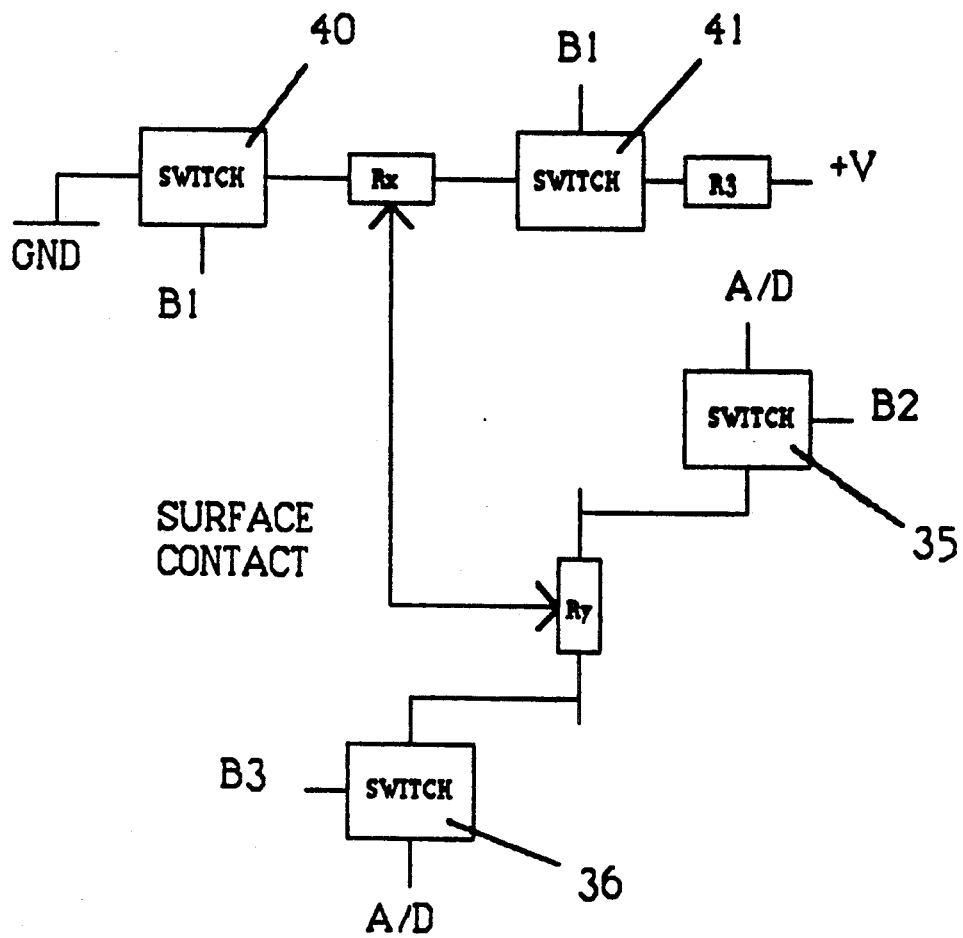
FIGS. 5A and 5B are equivalent circuits for coordinate determination in the contact mode.
Figure 5B:
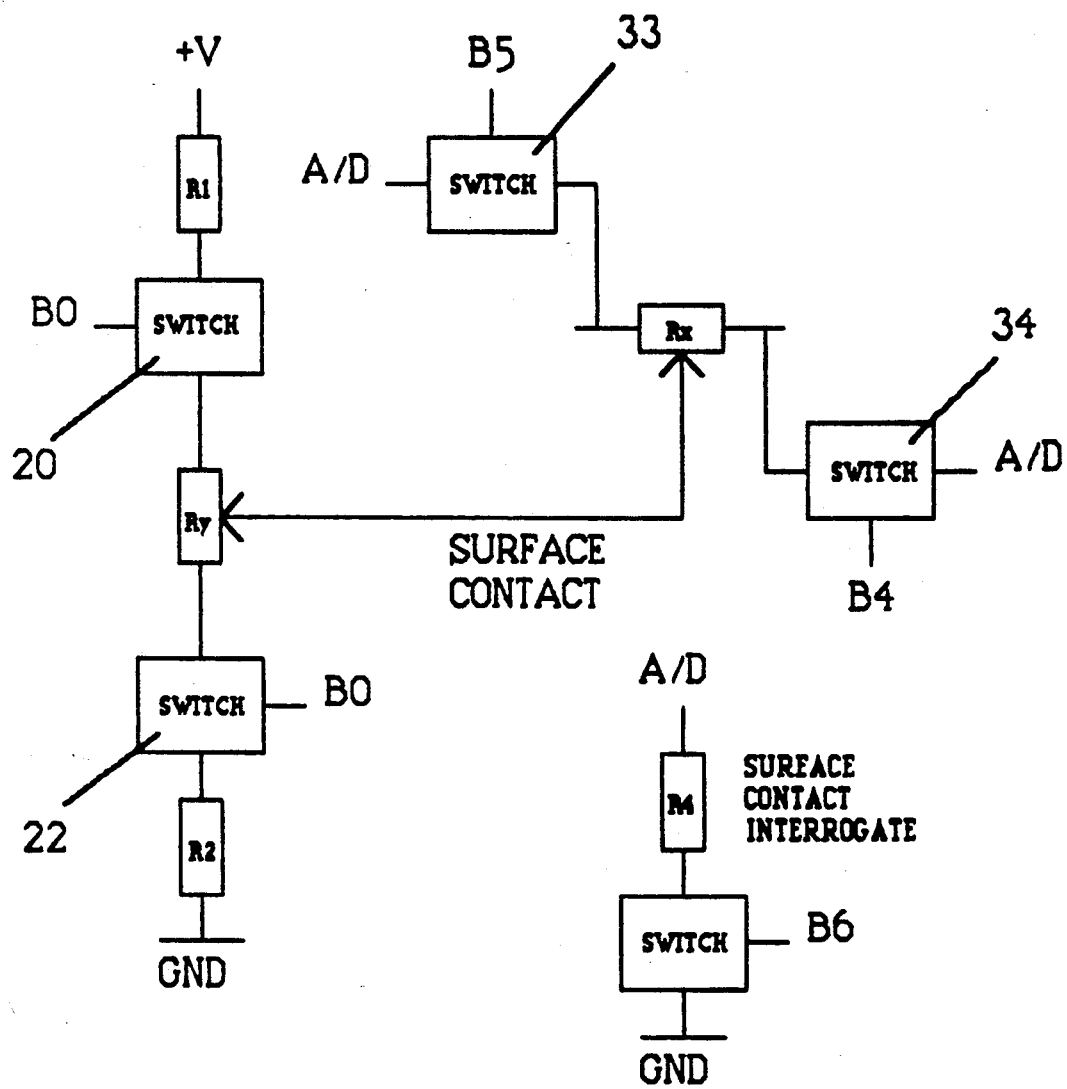

When in the contact mode, as shown in FIGS. 5A and 5B in conjunction with the FIG. 7B sequence, first the X coordinate of contact is determined by applying a voltage V+ through $R_3$, through switch 41 energized by current B1, through the X-axis of the blackboard $R_x$, through switch 40 energized by current B1 to ground.

As can be seen in FIG. 5A, voltage V+ is channelled through resistor $R_3$, switch 41, $R_x$ and switch 40 to ground. This forms a voltage gradient along the X surface represented by $R_x$. At the same time, if there is contact, a signal proportional to the X position of contact is present at the contact point on $R_y$. This signal is routed to the analog to digital converter via switches 35 and 36. Since there is no voltage gradient across $R_y$ (switches 20 and 22 are open) and since the input impedance of the analog to digital converter is orders of magnitude higher than the value of $R_y$ (no matter what the Y position of contact) the $V_x$ value measured by the analog to digital converter is accurate. This value, along with the previously obtained edge values, computed during the calibration cycles (when there is no surface contact) allow the host computer to compute the correct value of the physical point of contact along the X axis.

Now, if the sequence of FIG. 7B is continued, and if contact is still present, the X measurement is accepted as valid, since surface contact continued to be present during the following time period.

Following this, a Y measurement is started and FIG. 5B comes into play, voltage V+ is channelled through resistor $R_1$, switch 20, $R_y$, switch 22 and resistor $R_2$ to ground. This forms a voltage gradient along the Y surface represented by $R_y$. At the same time if there is contact, a signal proportional to the Y position of contact is present at the contact point on $R_x$. This signal is routed to the analog to digital converter via switches 33 and 34. Since there is no voltage gradient across $R_x$ (switches 40 and 41 are open) and since the input impedance of the analog to digital converter is orders of magnitude higher than the value of $R_x$ (no matter what the X position of contact) the $V_y$ value measured by the analog to digital converter is accurate. This value, along with the previously obtained edge values, computed during the calibration cycles (when there is no surface contact) allow the host computer to compute the correct value of the physical point of contact along the Y axis.

Now, if the sequence of FIG. 7B is continued, and if contact is still present, the Y measurement is accepted as valid, since surface contact continued to be present during the following time period.

The system then displays the point of contact on video display terminal 8. The contact interrogation circuit is again activated, and the system will either stay in the contact mode or enter the self-calibration mode, depending upon contact.

Additionally, pen tray 15 as shown in FIG. 1 can be a part of the system. Each felt pen would be a specific colour and reside in its own specific slot. When the pen is removed from its slot, a sensor would be activated and would signal the microprocessor 6 that a certain pen slot has no pen. This, in turn, would cause the video display terminal to display its signals in a specific predetermined colour.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention.

I claim:

1. A method of determining horizontal X and vertical Y coordinates in an electronic blackboard system having spaced apart first and second electronically conductive surfaces at least the outer one of which is flexible enough to permit contact between the first and second surface, each said surface being rectangular and having an electrode attached to a pair of parallel edges thereon, the electrodes on the two surfaces thereby being arranged at right angles to each other, said method comprising:
   a) determining if contact has occurred between the said surfaces as follows:
      i) applying a current across the electrodes of a selected one of said surfaces;
      (ii) connecting a voltage measuring circuit to the electrodes of the other said surface;
      (iii) applying a predetermined load to the said voltage measuring circuit, whereby voltage in said other surface is brought down to below a threshold level if there is no contact between the surfaces;
      iv) detecting a difference in voltage between said other surface and a reference by said voltage measuring circuit if said other surface is brought into contact with said selected surface; and
      v) determining whether said detected voltage is above said threshold level, for determining whether contact has occurred;
   b) if contact is determined, measuring an X coordinate by application of a voltage across the electrodes of the X-axis, and measurement of the voltage across the Y axis;
   c) determining if contact has occurred, by following the steps of paragraph (a) above;
   d) if contact is determined by step (c), measuring a Y co-ordinate by application of a voltage across the electrodes of the Y-axis, and measurement of the voltage across the X-axis;
   e) determining if contact has occurred by following the steps of paragraph (a), above;
   (f) if contact is determined by step (e) converting the X and Y values obtained to digital form, for use in a video output;
   g) if no-contact is determined at stages (a), (c) or (e), performing a method of self-calibration comprising the following steps:
      i) applying a voltage to the first pair of parallel electrodes, said second pair of electrodes having no voltage applied directly thereto;
      ii) connecting a voltage measuring circuit to one parallel electrode of the first pair of electrodes and recording the measured voltage;
      iii) connecting a voltage measuring circuit to the other parallel electrode of the first pair of electrodes and recording the measured voltage;
      iv) applying a voltage to only the second pair of parallel electrodes;
      v) connecting a voltage measuring circuit to one parallel electrode of the second pair of electrodes and recording said measured voltage;
      vi) connecting a voltage measuring circuit to the other parallel electrode of the second pair of electrodes and recording the measured voltage;
      vii) converting each of said four measured voltages to digital data; and
      viii) continuously updating previously recorded measurements with new measurements
   wherein after each of steps (ii), (iii), (v) and (vi) of said self-calibration method, contact is determined according to the method described above in paragraph (a), and said self-calibration method is continued only in the event no-contact is determined, said continuous updating being performed by utilizing a running average of a predetermined number of measurements.

2. A method as claimed in claim 1, wherein said rectangular surfaces have a pair of parallel short edges and a pair of parallel longer edges, and there is provided, in the circuit of the longer edge a resistor that establishes a threshold voltage for the Y axis.

3. A method of continuous self-calibration for an electronic blackboard display system having first and second spaced-apart electronically conductive surfaces, each said first and second surfaces respectively having a first and second pair of approximately parallel electrodes proximate to the ends of said first and second surfaces, said first pair of electrodes being approximately orthogonal to said second pair of electrodes, at least one of said first and second surfaces being sufficiently resilient to permit establishment of contact between said first and second surfaces upon application of pressure to said one surface, a voltage source capable of being connected to each pair of parallel electrodes which, when connected to the first or second pair of electrodes respectively when contact is established between said first and second surfaces, will cause a first or second signal respectively to be generated, and when said contact is not established, causing at least one non-contact signal to be generated, said method comprising the following steps when a non-contact signal is generated:

(i) applying a voltage to the first pair of parallel electrodes, said second pair of electrodes having no voltage applied directly thereto;

(ii) connecting a voltage measuring circuit to one parallel electrode of the first pair of electrodes and recording the measured voltage;

(iii) connecting a voltage measuring circuit to the other parallel electrode of the first pair of electrodes and recording the measured voltage;

(iv) applying a voltage to only the second pair of parallel electrodes;

(v) connecting a voltage measuring circuit to one parallel electrode of the second pair of electrodes and recording said measured voltage;

(vi) connecting a voltage measuring circuit to the other parallel electrode of the second pair of electrodes and recording the measured voltage;

(vii) converting each of said four measured voltages to digital data; and (viii) continuously updating previously recorded reference values measurements with new reference values measurements.

4. The method of claim 3 wherein a contact determination circuit is connected and disconnected to said electronic blackboard display system at predetermined time intervals, and if contact is detected, said display system switches from a self-calibration mode to a contact mode causing a signal corresponding to said contact signals to be displayed on said video display.

5. The method of claim 4, wherein said contact determination is performed between each voltage measurement of said self-calibration method.

* * * * *